(No Model.)
J. HENRIE.
VEHICLE SPRING.
No. 495,489. Patented Apr. 18, 1893.
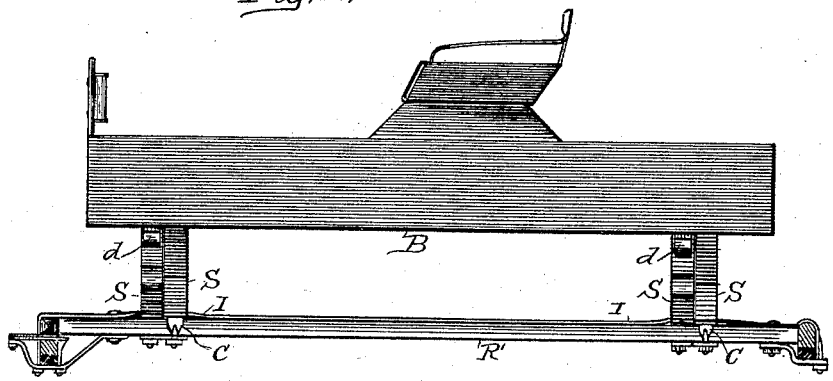
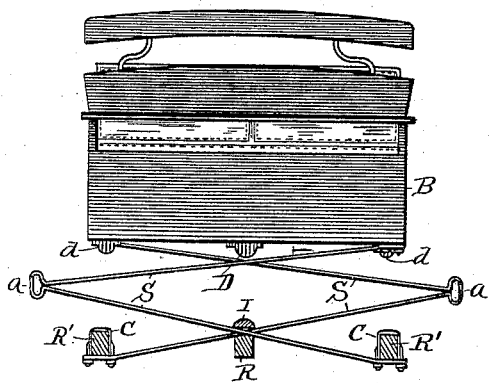
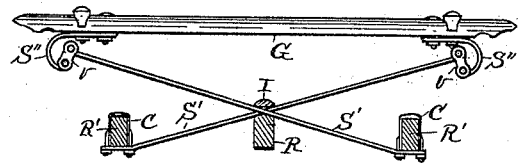
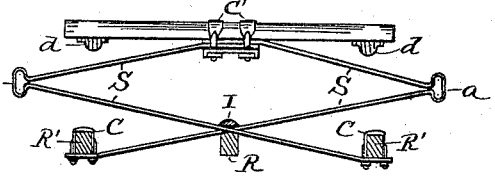
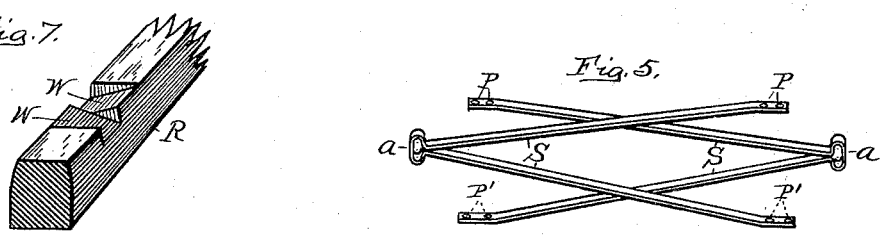
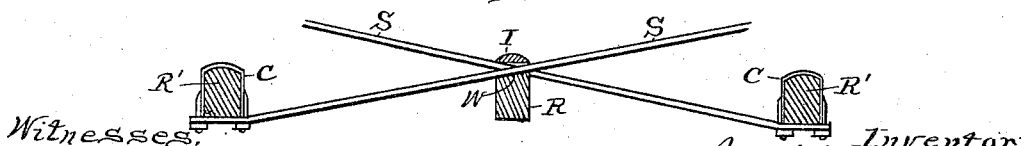
Witnesses:
N. B. Hagin
John J. Crist
Inventor:
Joseph Henrie
By Wm. J. Hutchins
att'y

United States Patent Office.

JOSEPH HENRIE, OF BENTON, KANSAS.

VEHICLE-SPRING.

SPECIFICATION forming part of Letters Patent No. 495,489, dated April 18, 1893.

Application filed March 22, 1892. Serial No. 425,956. (No model.)

*To all whom it may concern:*

Be it known that I, JOSEPH HENRIE, a citizen of the United States of America, residing at Benton, in the county of Butler and State of Kansas, have invented certain new and useful Improvements in Vehicle-Springs, of which the following is a specification, reference being had therein to the accompanying drawings and the letters of reference thereon, forming a part of this specification, in which—

Figure 1, is a side elevation of a vehicle body, and gear thereof, omitting the wheels, showing the application of my improved springs; Fig. 2, an end elevation, looking at the rear, of the same, showing the gear reaches in cross-section. Figs. 3 and 4 are similar views omitting the vehicle body, and showing cross-bars to which a body may be secured, also showing modifications in the manner of connecting the upper end of the springs to the cross-bar; Fig. 5, a detailed perspective of a pair of the springs; Fig. 6, a detailed cross-section of the vehicle reaches, and an edge view of the lower end portion of a pair of springs, showing the manner of their attachment to the reaches, and Fig. 7, is a detailed perspective of a section of the center reach of the vehicle, showing the manner of its formation at the place where the springs rest upon it.

This invention relates to certain improvements in road vehicles, and relates particularly to the springs, and the manner of arrangement and formation of the vehicle reaches to which the springs are attached, which improvements are fully set forth and explained in the following specification and pointed out in the claims.

Referring to the drawings B represents the vehicle body, and R, R' and R' the reaches of the gear of the vehicle, which connects at their rear end to the rear axle and to the sand board or rail at their forward ends, in the usual manner.

S and S represent the vehicle springs, and are made of flat spring metal bent into V shape; being formed at their bend with an elongated loop portion $a$ which form of bend avoids short or abrupt bends at places where they would be liable to break, were short bends made; and are formed at their terminals with short parallel portions which are provided with holes for securing them into position in service, as is shown at P, P', in Fig. 5. The springs thus formed are arranged in pairs cross-wise under the vehicle body, a pair at or adjacent each end of the body, and at each pair one spring is arranged at the side of, and in a reverse position to its fellow spring, and are secured into position, at their upper, end, by being bolted to some suitable part of the body bottom, or sills thereof, by placing the bolts through their holes P, and, at their lower end by being clipped to the under side of the side reaches R', R', each spring to its respective reach, by means of clips $c$, $c$, which have their screw threaded portions arranged through the holes P', P', as shown, and are supported at their lower portions, jointly, by resting upon the center reach R, said reach being formed with the reversely incline surfaces W, W, as shown in Fig. 7, upon which surfaces the springs respectively rest, and are held thus seated by means of a metal strap I secured to the upper side of said reach and passing over, and resting upon the springs.

D represents a buffer, preferably of rubber, but may be of any suitable material, and is secured to the under part of the body over the upper portion of the springs at the point of their cross—; which is the center line of the body; and is broad enough to cover both springs of a pair. It is intended that the tension of the springs shall be sufficient to support the body independent of said buffer, but that, when other weight is placed in the body, as by a person or persons getting in the body, the springs will yield and thus bring said buffer down upon the springs at the point of their cross; which is central of their extending limits; when the body becomes supported by the central bearing of said buffer and the central bearing at the center reach, and steadied by the spring parts extending from said bearings to their respective securings.

$d$, and $d$, are buffers secured to the body bottom, and at each side, and one over each spring, and are for the purpose of preventing the body striking down hard upon the springs when carrying a heavy load, or from the action caused by rough roads, ruts and the like, but are not essential in all instances, and may be dispensed with if desired.

In Fig. 3. the spring parts S' are like unto those of the lower portion shown in Fig. 2. and the parts S'' equivalents for the upper parts of the springs shown in Fig. 2. and are shown as modified in so much as, instead of being bent to form said two parts integral, they are made with a link joint as shown at $v.$ $v$, but in such modification the reach connections and the bearing on the center reach is still preserved, also in said view the upper spring parts are shown connected to a cross bar G, which is common in some vehicles, and illustrates how such connections are made, and in Fig. 4. a modification is shown, in which the springs are shown secured to the center portion of a cross bar, at their upper portions and terminate at such connection, but in such modification the general form and center bearings are maintained.

Having thus described my invention, what I claim as new and useful, and desire to secure by Letters Patent, is as follows:

1. In a vehicle, the combination with the reaches and body thereof, of the springs consisting of flat spring metal bent, respectively, to provide a downwardly inclined portion and an upwardly inclined portion, and formed with the elongated loops at their bends; being arranged in pairs and in reverse positions as shown, and secured into position by being clipped, at their lower portion to the side reaches and jointly resting upon the center reach, of the vehicle, and by being bolted, at their upper terminals to the body bottom; and of the buffer fixed centrally to the body bottom and adapted to bear jointly upon the springs, when brought down, substantially as set forth.

2. In a vehicle, the springs thereof consisting of pairs, of recumbent V shaped parts oppositely arranged as shown, secured at their lower terminals to side reaches, and at their upper terminals to the body or cross bars, of a vehicle, and bearing jointly, at their lower portion upon a center reach of the vehicle, substantially as set forth.

3. The combination in the vehicle described, with the reaches thereof, of the springs secured to said reaches, at their lower portion, by placing their terminal portions under the side reaches, being held by clips or equivalent means, and resting jointly upon the center reach, being held from rising from said center reach by means of the metal strap arranged over them, substantially as set forth.

4. The combination in the vehicle, with the body and reaches thereof; of the recumbent V shaped springs oppositely arranged in pairs laterally between said body and reaches; resting jointly at their lower portion upon a center reach or equivalent support, and secured, at their upper end portions to the vehicle body or bars thereof, and of the buffer or equivalent bearing arranged centrally over the upper portions of the springs, adapted to be brought down and thereby rest upon said springs to centrally support the body, substantially as specified.

JOSEPH HENRIE.

Witnesses:
J. W. DILL,
B. F. MATHERS.